United States Patent

[11] 3,582,930

[72] Inventor Alfred N. Wiley
431 Glenchester, Houston, Tex. 77024
[21] Appl. No. 806,152
[22] Filed Mar. 11, 1969
[45] Patented June 1, 1971

[54] DEVICE FOR INDICATING THE PRESENCE OF CONDUCTIVE FLUIDS
1 Claim, 3 Drawing Figs.

[52] U.S. Cl. .................................................. 340/244, 340/214
[51] Int. Cl. .................................................. G08b 21/00
[50] Field of Search ......................................... 340/235, 242, 244, 214; 73/304

[56] References Cited
UNITED STATES PATENTS
| 1,049,952 | 1/1913 | Walton | 340/214UX |
| 336,078 | 2/1886 | Ball | 340/242 |
| 2,372,489 | 4/1945 | Hampson | 340/242UX |
| 3,069,671 | 12/1962 | Taylor | 340/244 |
| 3,142,830 | 7/1964 | Patrick et al. | 340/235 |

Primary Examiner—John W. Caldwell
Assistant Examiner—Daniel Myer
Attorney—Larson, Taylor, and Hinds ABSTRACT: An electrical device for sensing the presence of fluids includes a pair of spaced electrodes connected in a series electrical circuit with an indicator and a source of electrical energy. Contact of the electrodes with an electrically conductive fluid completes the electrical circuit through the space between the electrodes and the resulting current flow activates the indicator.

PATENTED JUN 1 1971　　　3,582,930

INVENTOR
ALFRED N. WILEY

BY Larson and Taylor

ATTORNEYS

3,582,930

DEVICE FOR INDICATING THE PRESENCE OF CONDUCTIVE FLUIDS

FIELD OF THE INVENTION

The present invention relates to electrical sensing devices and to sensing devices which provide an indication of the presence of a fluid such as by monitoring the level of a fluid and providing an indication where the level exceeds predetermined bounds. More particularly, the present invention relates to sensing devices which indicate the presence of or, in a specific embodiment the level of, an electrically conductive fluid, the electrically conductive fluid being utilized to complete the sensing circuit to thus activate an indicator or a further device for performing a corrective function.

BACKGROUND OF THE INVENTION

Prior art liquid level detecting devices may generally be divided into two broad classes. Early devices of this type utilize some form of mechanical float system connected to an indicator to sense the liquid level and to provide an indication thereof. Although generally satisfactory, such devices suffer a number of disadvantages. For example, these devices are generally bulky and require relatively permanent installation.

More recently, electrical detecting devices for performing a liquid level sensing function have been used. A typical device of this type employs a solid-state sensor such as a thermistor to detect changes in the level of the liquid. Such devices depend on sensing the difference between the ambient temperature of the atmosphere and the temperature of the liquid itself in providing an indicating signal. Perhaps the two most serious disadvantages of such devices are those related to the sensitivity of the device and to the durability thereof. Regarding sensitivity, it is noted that if such devices are made too sensitive a false reading may occur due to minor changes in ambient temperatures or to movement of the fluid itself. On the other hand, if the devices are not sensitive enough they may not be suitable for use where it is necessary to detect a slight temperature differential between the atmosphere and the fluid. Further, it will be appreciated that such solid-state sensors may not be sufficiently rugged and durable to permit use thereof under extreme operating conditions. Another disadvantage of such systems is that the continuous current flow in the sensor circuit acts as a drain on the power source, which is typically a simple battery.

SUMMARY OF THE INVENTION

In accordance with the present invention an electrical sensing device of the general type described is provided which does not suffer from the disadvantages of the prior art described hereinabove. The sensing device of the present invention is economical to manufacture, is portable, provides minimum drain on the power supply, and is easily installed and operated.

In accordance with a presently preferred embodiment of the invention a sensing system is provided which basically comprises a sensor connected in series with a source of energy and means for producing an output signal responsive to the series circuit being completed through the sensor. In accordance with an important feature of the present invention the sensor comprises first and second spaced electrodes which, for example, where the level of a conductive fluid is being monitored, are positioned in the test area such that the electrodes will be immersed in the fluid upon a predetermined rise in the fluid level. With the electrodes immersed in the conductive fluid the sensing circuit will be completed and an output signal such as a characteristic tone will be provided. In another use of the present invention, the electrodes may be positioned to monitor the presence of a conductive fluid or the amount of a conductive fluid relative to a nonconductive fluid within a well, pipeline or the like such that where the quantity of conductive fluid present reaches a level at which conduction takes place between the spaced electrodes an output signal will be produced.

Other features and advantages of the present invention will be set forth in or apparent from the detailed description of preferred embodiments of the invention found hereinbelow.

DESCRIPTION OF THE PREFERRED EMBODIMENTS

Figure 1:
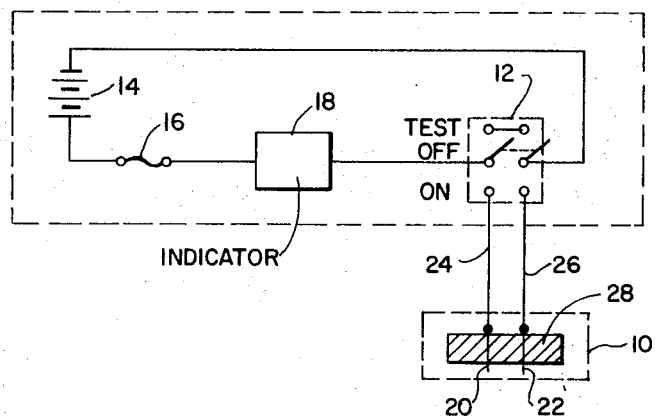
FIG. 1 is a schematic circuit diagram of a presently preferred embodiment of the invention.

Referring to FIG. 1, a sensor 10 is adapted to be connected, by means of a switch 12, in series with a unidirectional source of current such as a DC battery 14, a fuse 16, and an indicating device 18. Switch 12 is a three-position switch which in the test position thereof as indicated in FIG. 1 provides bypassing of sensor 10. In the "on" position of switch 12 the series circuit is completed through sensor 10. It will be appreciated that switch 12 permits periodic testing of battery 14 and indicator 18 to ascertain whether the circuit is in operating condition. Indicator 18 provides an output signal responsive to the completion of the series circuit and in a preferred embodiment comprises an audio transducer such as that marketed by P.R. Mallory & Company, Incorporated, under the trademark "SONALERT".

Figure 3:
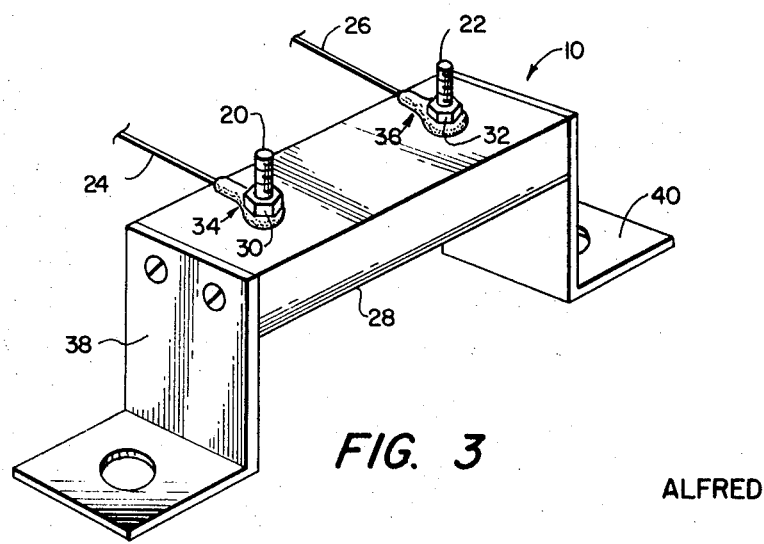
FIG. 3 is a detail view of the sensor of FIG. 1.

Sensing device 10, best seen in FIG. 3, basically comprises first and second spaced electrodes 20 and 22 which are connected through leads 24 and 26 to the "on" terminals of switch 12. Electrodes 20 and 22 may be constituted by threaded screws or bolts of electrically conductive material received in spaced boreholes drilled in a block of insulating material 28. Electrodes 20 and 22 may be fixed in place by locking nuts 30 and 32 and connected to leads 24 and 26 by conventional connector devices generally denoted 34 and 36 such as spade connectors or alligator clips. First and second L-shaped brackets 38 and 40 are affixed to the ends of insulating block 28 and are adapted to provide easy mounting of the electrodes 20 and 22 in the test area.

In operation, when electrodes 10 and 12 contact an electrically conductive fluid a series circuit is completed permitting current flow from battery 14 through electrode 20, the conductive fluid, and electrode 22, and through indicator 18, resulting in activation of indicator 18. It will be appreciated that because current flows in the series circuit only when the electrodes 20 and 22 make contact with an electrically conducting fluid, there will be no drain on battery 14 under normal conditions and thus a simple battery such as commonly used in portable radios may be utilized.

Figure 2:
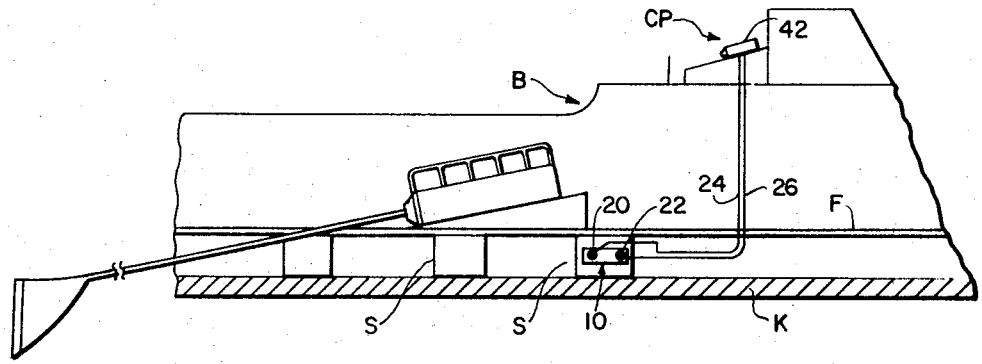
FIG. 2 illustrates diagrammatically the installation of the sensing device of the present invention for monitoring the water level in the bilge of a boat.

In accordance with an important feature thereof, the system of the present invention may be utilized in small to medium sized power boats, barges, floats or other marine equipment to provide an operator with a warning of an abnormal rise of the water level in the bilge. As is indicated diagrammatically in FIG. 2, the sensor 10 may be mounted in the bilge on a floor support (denoted S) above the normal water level. In this regard, it will be appreciated that water is normally found in the bilge and that the sensor 10 is designed to provide an alarm only where this water level exceeds a predetermined value. Sensor 10 would normally be located aft in a boat so that a warning is provided where water is taken on while underway. Further, a number of sensors 10 could be utilized at various points in the boat, the sensors 10 being connected in parallel such that completion of the series circuit through any of the sensors will provide an alarm signal. Referring again to FIG. 2, sensor 10, is, as stated, mounted on a support member S between the floor F and the keel K of a boat generally denoted B. Sensor 10 is connected through leads 24 and 26 to the remainder of the circuit which is contained in a control box 42 located in the console or master control panel denoted CP. In operation, a rise in the level of the water between floor F and keel K to the level at which sensor 10 is located on support S will cause completion of the series circuit including indicator 18 so that an alarm signal will be produced at the control panel CP.

As stated hereinabove, the system of the present invention is not limited to use in detecting water levels and may be utilized to detect the presence of a conductive fluid. For example, sensing unit 10 may be located in a tank well, pipeline or other container which may be empty or contain a nonconductive fluid. Under these circumstances sensor 10 will provide an indication of the presence of an electrically conductive fluid where the fluid content of the container reaches a level such that conduction takes place between electrodes 20 and 22 or where the ratio of conductive fluid to nonconductive fluid is such that such conduction takes place.

Although the preferred embodiments of the invention have been described in relationship to providing an alarm signal, it will be appreciated that the completion of the series electrical circuit may be used to energize a corrective device such as a blower, pump or evacuator to clear the test area of the unwanted fluid. Further, the invention may be utilized in detecting the presence of conductive gases and fluid or semifluid solids as well as liquids such as water.

It will be understood by those skilled in the art that the embodiment of the invention shown and described herein is subject to various other modifications without departing from the scope and spirit of the invention. Accordingly, it should be understood that the invention is not limited by the exemplary embodiments shown and described.

I claim:

1. A device for indicating the presence of water above a normal water level in the bilge of a hull of a watercraft, comprising a source of electrical energy comprising a DC battery, sensing means comprising first and second electrodes mounted in spaced relationship in a block of insulating material, a pair of brackets, one end of each of said brackets being secured to the block of insulating material, the other end of said pair of brackets resting on the hull of the watercraft whereby the electrodes are mounted in the bilge of said craft at a predetermined level above the hull of the watercraft, transducer means connected in a series electrical circuit with said source of electrical energy and said sensing means for producing an audible alarm signal responsive to the completion of said series circuit between said spaced electrodes by the presence of water at said predetermined level, and testing means including a triple-throw switch located at a control station in said craft for testing the operability of said series electrical circuit, said switch including an off position wherein said circuit is open circuited, a test position wherein said circuit is completed directly through said switch and an on position wherein said circuit, if completed, is completed through said electrodes, said transducer being located at said control station.